Figures 1, 4, 5:
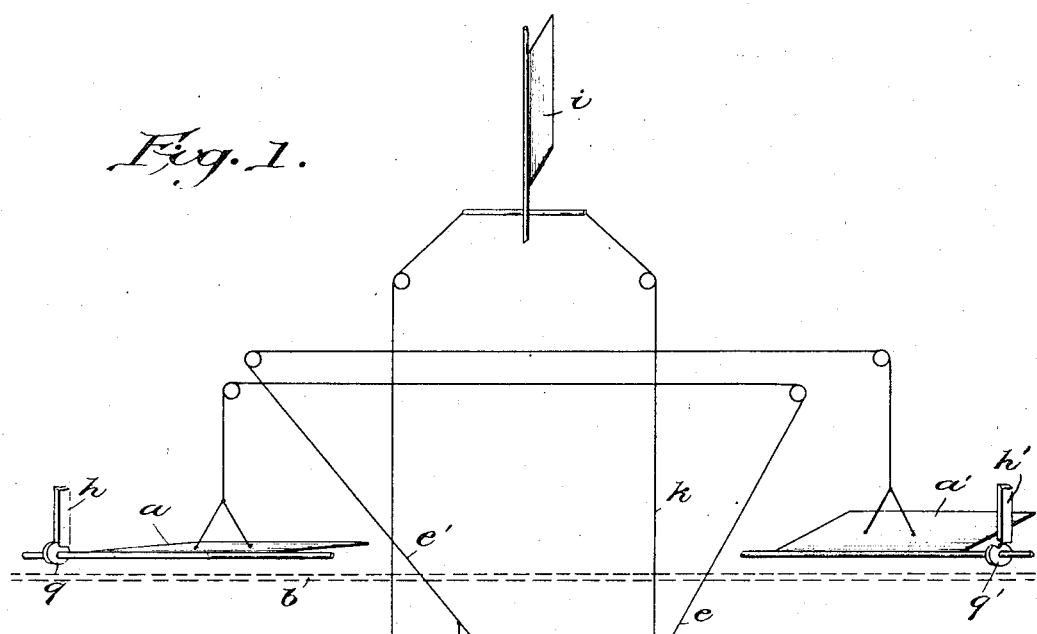

Inventors
GLENN H. CURTISS.
HENRY KLECKLER.

G. H. CURTISS & H. KLECKLER.
BALANCING SYSTEM FOR AIRCRAFT.
APPLICATION FILED JAN. 8, 1915. RENEWED JAN. 6, 1916.
1,246,013.
Patented Nov. 6, 1917.
2 SHEETS—SHEET 2.
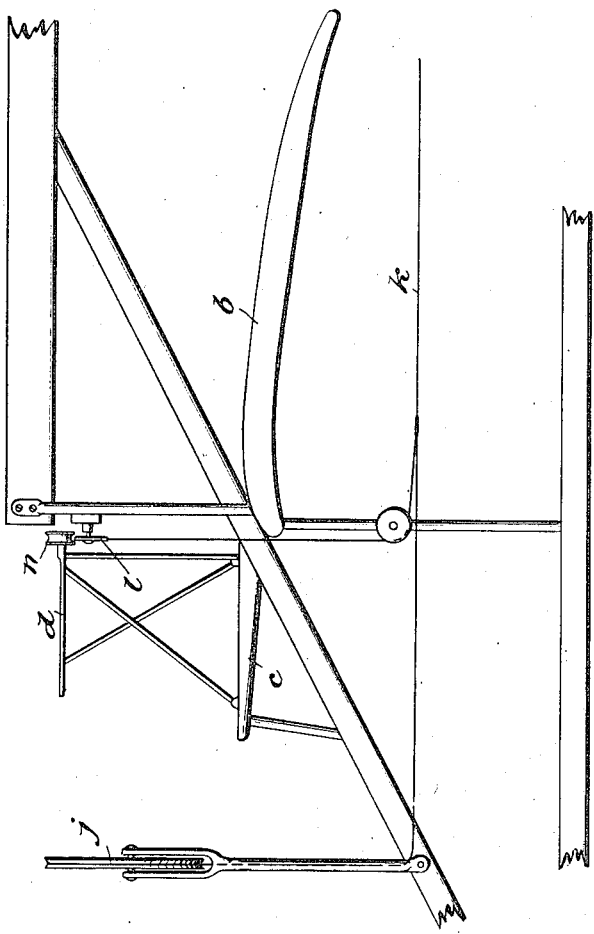
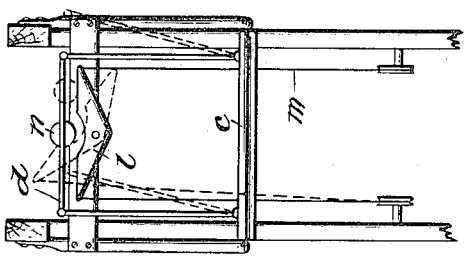
Witnesses
Inventors.
GLENN H. CURTISS.
HENRY KLECKLER.
Attorneys

UNITED STATES PATENT OFFICE.

GLENN H. CURTISS AND HENRY KLECKLER, OF HAMMONDSPORT, NEW YORK, ASSIGNORS TO THE CURTISS MOTOR CO., OF HAMMONDSPORT, NEW YORK, A CORPORATION OF NEW YORK.

BALANCING SYSTEM FOR AIRCRAFT.

1,246,013.      Specification of Letters Patent.      Patented Nov. 6, 1917.

Application filed January 8, 1915, Serial No. 1,061. Renewed January 6, 1916. Serial No. 70,701.

*To all whom it may concern:*

Be it known that we, GLENN H. CURTISS and HENRY KLECKLER, citizens of the United States, residing at Hammondsport, in the county of Steuben and State of New York, have invented certain new and useful Improvements in Balancing Systems for Aircraft, of which the following is a specification.

Our invention relates to control systems for air craft, of the type which has come to be known as the Merrill control system. This system differs in principle wholly from the control systems invented by the Wright brothers. The system of the Wright brothers includes balancing surfaces at each lateral extremity of the craft movable about transverse axes, together with means to simultaneously operate these surfaces in opposite directions, to increase the angle of incidence of the balancing surface on the lower side of the craft and to decrease the angle of incidence of the balancing surface on the high side of the craft. The vertical rudder is simultaneously moved toward the side of least resistance, to wit, the high side, whereby the deviation of the craft from its course during unbalancing is prevented.

According to the Merrill system on the other hand there are provided two similarly arranged balancing surfaces, but only one of them is moved at a time, that one on the high side of the machine, and the angle of incidence of this one is increased instead of decreased. It is moved from a neutral or substantially neutral position to a negative angle of incidence (never to a positive) whereby the high side is depressed. At the same time the high side is made the side of greatest head resistance as contradistinguished from the side of least head resistance and the rate of speed of that side is thereby decreased with the resulting decrease in the lift of that side of the craft, whereby the balancing surface is assisted in preserving the balance. The vertical rudder may be at the same time moved toward this side of greatest head resistance accentuating the retardation of the high side, though this is not often necessary.

In the operation of this system it has been found that serious difficulties are encountered by the novice in learning to fly this type of machine, and serious mistakes have been made by professional flyers in moving the vertical rudder toward the side of least resistance during periods of emergency when it should be moved toward the side of greatest resistance to assist in the restoration of balance by increasing the swerve of the machine from its course with a retardation and decreased lift of the high side. This mistake is particularly liable to be made in severe weather conditions and in making turns, at which times the operation of the various rudders of the system must be very quickly carried out.

According to our invention we provide interlocking devices between the vertical rudder and the balancing device whereby when either balancing device is out of its normal position, the vertical rudder can be moved only toward the side of greatest head resistance, and in case the rudder should happen to be moved to the opposite side upon the initiation of any unbalancing, operation of either of the balancing devices to correct the unbalancing will restore the rudder to neutral position. Our invention further contemplates the introduction of a certain amount of lost motion in the interlocking devices whereby small and comparatively immaterial movements of the balancing devices and the vertical rudder may be made independently. The amount of this independent movement permissible will depend upon the sensitiveness of the air craft in response to its controls.

In the accompanying drawings we show several of the best embodiments of our invention now known to us. Of the drawings, Figure 1 is a diagrammatic illustration of the system of our invention, Fig. 2 is a side elevation of a Curtiss type control applied to an air craft, Fig. 3 is a front elevation thereof showing the interlocking devices of our system in elevation, and Figs. 4 and 5 are front elevations of modified forms thereof.

The various elements of the system of our invention are characterized as follows, identification of the various parts being made by the reference letters by which they are designated in the drawings.

(*a—a'*) The balancing devices, one of which is located at each lateral extremity of the craft and each of which is movable about a transverse axis. As shown these balancing devices are of the Curtiss type, but they may be of any other known type of rigid or flexible surfaces or the equivalent.

(*b* of Fig. 1) One of the main supporting surfaces of the air craft. These surfaces lie intermediate the balancing devices *a—a'* of Fig. 1 but are omitted from Fig. 1 for the sake of clearness.

(*c*) The operator's seat which is mounted upon the frame of the craft in any well known manner.

(*d*) The shoulder fork control member may be substituted for this.

(*e—e'*) Control cables extending between the operator's shoulder forks *d* and the balancing devices *a—a'* respectively.

(*f—f'*) Springs under sufficient tension to keep the slack out of the cables *e—e'* but insufficient to move the balancing devices *a—a'* from their normal positions against the air rush or against the force of gravity or against the two combined. These may be omitted if desired, or the slack in the cables *e—e'* taken care of in other ways.

(*g—g'*) Movable abutments connected with the balancing devices *a—a'*. These may be connected with any movable part connected with said balancing device.

(*h—h'*) Fixed abutments in the path of the movable abutments *g—g'* so positioned relatively to the movable abutments that the surfaces *a—a'* can be moved only to positions above their normal planes in which they extend at negative angles of incidence.

(*i*) The vertical rudder or its equivalent.

(*j*) The steering wheel or other control means for the vertical rudder, as shown of the Curtiss type and mounted at the top of a vertical post.

(*k*) Operating cables extending from wheel *j* to the vertical rudder *i*.

(*l*) The principal element of the interlocking device. This device consists in this embodiment of a centrally pivoted transversely extending bar mounted upon a fixed part of the frame immediately in the rear of the shoulder fork control member *d*.

(*m*) The interconnections between the vertical rudder *i* and the interlocking bar *l*. As shown these are cables extending from cables *k* one to each end of the bar *l* and adapted to rock the same in one direction or the other according to the direction in which the rudder *i* is moved.

(*n*) A roller journaled on the back of the shoulder fork *d* in the plane of the interlocking bar *l* and arranged when the shoulder fork *d* is operated to move over the top surface of the bar *l*. Normally this roller or its equivalent lies over the center of the bar *l* which center is hollowed out slightly to admit a certain amount of lost motion. The axis of the roller *n* lies above the pivot of the bar *l*.

(*o*, Fig. 4) A modified form of interlocking bar *l* which is pivoted approximately upon the axis of the roller *n*. The upper surface of this bar underlies the roller *n* however, and is curved on an arc defined by the movement of the roller *n* as shown in dotted lines.

(*p*, Fig. 5) A further modification of the interlocking bar *l*. According to this modification, the bar is pivoted as in the modification of Fig. 4, upon the axis of the roller *n*, but its under surface overlies the roller *n* and is curved on an arc defined by the upper surface of the roller *n* in its movements.

Various other interlocking means of practically any desired form may be substituted for that shown, that illustrated being chosen primarily for its simplicity and lightness of construction. The bar *l* may be an ordinary steel or aluminum plate, and the cables *k* the ordinary flexible steel cables.

The operation of our invention as thus organized is easily followed. As illustrated in Fig. 1 the craft is supposed to be unbalanced by lowering the right-hand side. The operator naturally leans toward the left or operates his control member toward the left, resulting in raising the balancing surface *a'* as indicated whereby a force tending to depress the left or high side of the craft is created. During this operation, the cable *e* connecting with the right-hand balancing device *a* is slackened, but this slack is taken up by the spring *f* or its equivalent. As long as device *a'* is maintained in the operated position, roller *n* remains over the left-hand end of the interlocking bar *l*, with the result that the vertical rudder *i* cannot be moved toward the low side or the side of least resistance. Thus no mistake can be made by any operator which will result in accentuation of the unbalancing and consequent danger or accident to the machine and its operator. At the same time if desired the rudder may be freely used to effect a turn toward the high side of the craft. In case at the commencement of any unbalancing, the rudder *i* should happen to be turned in such direction as would accentuate the unbalancing in a dangerous degree, the movement of the balancing devices from normal position to correct the unbalancing will automatically return the rudder to its normal position. This is effected through the action of the roller *n* upon the raised end of the interlocking bar *l*. If the operator therefore moves his balancing devices to correct an unbalancing, he must restore his rudder to the safe position. By reason of the lost motion between the roller *n* and the bar *l*, or other cooperating elements of the interlock, a slight movement of either the rudder *i* or the balancing surfaces *a—a'* is permissible without bringing the interlock into action. This lost motion is however preferably entirely eliminated once the coöperating elements *n* and *l* are brought into contact with each other. In the forms of Figs. 4 and 5 the lost motion is eliminated entirely, as is clear.

Having thus described our invention what we claim and desire to secure by Letters Patent is:

1. A flying machine comprising the following instrumentalities: supporting means, balancing means, and a vertical rudder, together with a locking device for the rudder controlled in the operation of the balancing means.

2. A flying machine comprising the following instrumentalities: supporting means, balancing means, and a vertical rudder, together with a locking device for the rudder normally in neutral or inoperative position but adapted to lock the rudder during operation of the balancing means.

3. A flying machine comprising the following instrumentalities: supporting means, balancing means, and a vertical rudder, together with a locking device for the rudder normally in inoperative or neutral position and adapted to lock the rudder against movement in one direction during operation of the balancing means.

4. A flying machine comprising the following instrumentalities: supporting means, balancing means, and a vertical rudder, together with a locking device for the rudder normally in inoperative or neutral position, and adapted to be operated so as to lock the rudder against movement toward the low side of the machine, when the balancing means is adjusted to lower the high side to balance.

5. A flying machine comprising the following instrumentalities: supporting means, balancing means, and a vertical rudder, together with interlocking devices between the rudder and the balancing means whereby when the balancing device is out of normal position, the rudder can be moved only toward the side of greatest head resistance.

6. A flying machine comprising the following instrumentalities: supporting means, oppositely disposed balancing means, and a vertical rudder, together with interlocking devices between the vertical rudder and the opposite balancing means, so arranged that when either balancing device is out of its normal position, and acting to balance, the vertical rudder can be moved only toward the side of greatest head resistance.

7. A flying machine comprising the following instrumentalities: supporting means, oppositely disposed balancing means, and a vertical rudder, together with interlocking devices between the vertical rudder and the opposite balancing means, so arranged that when either balancing device is actuated to balance, the vertical rudder can be moved only toward the side of greatest head resistance, and the operation of the balancing means will act to restore the rudder to neutral position, if previously displaced toward the side of least head resistance.

8. A flying machine comprising the following instrumentalities: supporting means, and a vertical rudder, together with a locking device for the rudder normally in inoperative or neutral position and responsive to the action of the balancing means when operated, to lock the rudder against movement toward the side of least resistance, while permitting movement of the rudder toward the side of greater resistance.

9. A flying machine comprising the following instrumentalities: a supporting plane, independently acting oppositely located wind pressure balancing means, a vertical rudder, means for separately and independently operating said balancing means, means for actuating the vertical rudder, and an automatically reversing interlocking device having complementary members connected to the balancing means and to the rudder respectively, and so related thereto and to each other that when a balancing means is actuated, the rudder will be locked against movement toward the side of least resistance, or high side of the plane, while remaining free to be moved toward the side of greatest resistance or low side thereof.

10. In a flying machine, the combination of control instrumentalities comprising a surface to control lateral balance of the machine, a surface to control lateral direction of the machine, means for independent operation of said surfaces and means to limit operation of said direction surface simultaneously with the operation of said balancing surface.

11. In a flying machine, the combination of control instrumentalities comprising a surface to control lateral balance, a surface to control lateral direction, means to independently operate each surface and an interlocking member operable to limit movement of the direction surface operating means, said member being automatically actuatable by the balancing surface operating means.

12. In a flying machine, the combination of control instrumentalities comprising a surface to control lateral balance of the machine, a surface to control lateral direction of the machine, an operating means for each surface, means constantly limiting movement of said balancing surface and means to variably limit movement of said direction surface in accordance with movement of the balancing surface.

13. In a flying machine, the combination of control instrumentalities comprising a surface to control lateral balance of the machine, a surface to control lateral direction of the machine, and means to operate each of said surfaces, a locking means effective upon the operating means for said direction surface to limit movement thereof in accordance with movement of said balance surface and means effective upon the latter surface to constantly restrict its movement.

14. In a flying machine, the combination of control instrumentalities comprising a surface controlling the lateral balance of the machine, a surface controlling the lateral direction of the machine, means to operate each of said surfaces independently and means to interlock the operation of said surfaces to limit the movement of said direction surface when said balancing surface is actuated, introducing lost motion into the locking action to permit movement of the rudder when the balancing surfaces are neutral.

In testimony whereof we affix our signatures in presence of two witnesses.

GLENN H. CURTISS.
HENRY KLECKLER.

Witnesses:
JANE MOORE,
G. R. HALL.

Copies of this patent may be obtained for five cents each, by addressing the "Commissioner of Patents, Washington, D. C."